United States Patent [19]

Weis et al.

[11] 4,152,732
[45] May 1, 1979

[54] DEVICE FOR CONTROLLING THE RECORDING AND PLAYBACK BY A TAPE RECORDER

[75] Inventors: Karl Weis; Dieter E. Warmbier, both of Bad Homburg, Fed. Rep. of Germany

[73] Assignee: Assmann G.m.b.H., Bad Homburg, Fed. Rep. of Germany

[21] Appl. No.: 863,715

[22] Filed: Dec. 23, 1977

Related U.S. Application Data

[63] Continuation-in-part of Ser. No. 717,151, Aug. 24, 1976, abandoned.

[51] Int. Cl.² .................... G11B 15/02; G11B 15/18; G11B 15/32
[52] U.S. Cl. ........................... 360/62; 179/100.1 DR; 360/96.3; 242/201
[58] Field of Search ................ 360/62, 74, 73, 90, 360/93, 96; 179/100.1 DR; 242/201

[56] References Cited

U.S. PATENT DOCUMENTS

| | | | |
|---|---|---|---|
| 3,547,446 | 12/1970 | Kern | 360/62 |
| 3,591,186 | 7/1971 | Kamiosaki | 360/62 |
| 3,877,074 | 4/1975 | Guttinger | 360/62 |
| 3,921,214 | 11/1975 | Nyffenegger | 360/62 |
| 3,930,266 | 12/1975 | Okamoto | 360/62 |
| 3,999,446 | 12/1976 | Louzil | 360/62 |
| 4,021,854 | 5/1977 | Saito | 360/62 |

*Primary Examiner*—Alfred H. Eddleman
*Attorney, Agent, or Firm*—Lane, Aitken & Ziems

[57] ABSTRACT

A device for controlling the operation of a tape recorder which may be used in miniature tape recorders or in hand-held microphones with remote control of the recorder, includes actuating means for positioning the tape drive into different operating conditions and comprises operating means for selecting the modes of operation "recording" and "playback". The actuating means provides for at least two of the four positions "stop", "slow forward run" for recording and playback, "rewind" and "fast forward run". The operating means comprise, besides a first position "playback" and a second position "recording", a third position "slow forward run+recording" in which the tape drive is in the condition "slow forward run" and the operation "recording" is selected when the actuating device is in the "stop" position.

9 Claims, 19 Drawing Figures

DEVICE FOR CONTROLLING THE RECORDING AND PLAYBACK BY A TAPE RECORDER

BACKGROUND OF THE INVENTION

This application is a continuation-in-part of our co-pending U.S. patent application Ser. No. 717,151, filed on Aug. 24, 1976 now abandoned and is related to U.S. Pat. No. 4,079,900 to Karl Weis assigned to the assignee of the present application.

The invention relates to a device for controlling the recording and playback by a tape recorder, which device may be used in miniature tape recorders or in hand-held microphones with remote control for the recorder, having actuating means for controlling the tape drive means and operating means for selecting the "recording" or "playback" modes of operation with the tape drive in the mode "slow forward run".

Such devices for controlling the recording and playback by a tape recorder have been employed, especially in miniature tape recorders which can be used as dictating machines and can be held in one's hand. They are also adapted to be built-in into hand-held microphones with remote control which are operated in combination with dictating machines. In order to ensure that operation of the hand-held tape recorder and the controlling microphone is simple and as clear as possible, it is necessary that the operating slider and the operating member which positions the device drive in the different operating modes and for choosing the operation "recording" and "playback" be arranged clearly and be operable preferably by one finger of the hand holding the tape recorder or the hand-held microphone. Furthermore, as many as possible of the different operating conditions of the tape drive should be controllable by the actuating slider and the operating member without additional keys, without having to change the position of the tape recorder in the hand and without having to use the other hand to control the hand-held tape recorder or the recorder operated with the hand-held microphone.

A device of the type mentioned above is known from the dictating machine "Stenorette 2000" of Grundig, wherein the actuating means controlling the tape drive mode is adapted to be shifted from a snapping-in-position "stop" into a snapping-in position "slow forward run" and then further in a spring-loaded position "fast rewind". By means of a separate operating member located above the actuating means, the modes "recording" or "playback" can be selected with the tape-drive in the mode "slow forward run" can be adjusted. When the actuating means is brought into the position "rewind," the operating member is switched-over automatically into the operating mode "playback". For another recording to begin at a predetermined point of the tape, the actuating means must be brought at a given time into the position "stop", then the operating mode "recording" must be adjusted by the operating member, and, finally, the actuating means must be brought into the position "slow forward run". In case of short-duration dictations, i.e., dictation with many pauses, it is necessary that the position of the operating member is correct, and the actuating means must be moved, constantly and repeatedly from the position "stop" into the position "slow forward run" and back again.

A corresponding device for the hand-held microphone of a tape recorder is described in U.S. Pat. No. 3,813,691. For recording dictation, and especially short dictations there are the same disadvantages as with the above-described device.

On the other hand, a device of the above-mentioned type is known from the apparatus "Dictaphone 10" which comprises an actuating slider for controlling the tape drive mode as well as a second slider which operates to select the operating modes "recording" or "playback" with the tape drive in the mode "slow forward run". In said apparatus, the actuating slider is adapted to be shifted from a snapped-in position "slow forward run" over a snapped-in position "stop" into a spring-loaded position "rewind". For recording, the actuating slider which controls the tape drive mode as well as the operating member, which is also a slider must be brought into the correct position. Moreover, also in case of short or continually-interrupted dictation the actuating slider must be actuated actively whenever a switching-over is effected from "stop" to "slow forward run". Moreover, there is the danger that when the actuating slider is switched-over from "slow forward run" to "stop", the operating mode "rewind" is unintentionally switched-in, so that the speed and expediency of the short dictate is obstructed and delayed considerably.

On the other hand, devices are known for controlling the recording and playback by tape recorders wherein, by means of one operating member, the tape drive mode as well as the operating mode can be adjusted. For example, U.S. Pat. No. 3,877,074 shows a slider which is adapted to be brought successively into the positions "recording", "position of rest", "playback" and "rewind". In the positions "recording" and "playback" the slow forward run is switched-in. Thus, tape drive modes as well as operating modes are adjusted by the slider. As the changing-over of the slider into the position "recording" releases also the tape drive mode "slow forward run", there is the danger, when the apparatus is operated erroneously by mistake, that certain portions of the recorded tape are erased by mistake. Therefore, an additional locking slider is provided which must be actuated before the control slider can be brought into the desired position. Two movements of the slider have to be performed before the device can be brought into the recording state "slow forward run+-recording". Due to the additional locking slider, the production cost is increased. Moreover, an erroneous incorrect operation is not excluded which may be caused by the uncertainty of the operator whether the locking slider and the slider have been actuated since both sliders require a uniform movement for operation. Moreover, two succeeding motions of the slider require more time and are complicated to perform.

A similar device to control the recording and playback of a dictating machine is known from German Offenlegungsschrift No. 2,302,954. The tape drive modes to be controlled and the operating modes "recording" and "playback" to be selected in said device are not clearly distributed, with regard to their function, to a setting member and an operating member. Furthermore, locking members are also necessary to secure the setting member in its position of rest.

SUMMARY OF THE INVENTION

It is an object of the invention to provide a device for controlling the recording and playback of a tape recorder of the above type which allows a simple and uncomplicated operation of the device, on the one hand, by a separate actuating member for the operation modes "recording" and "playback", whereby an erroneous adjustment of the operating mode "recording" is avoided, and wherein, on the other hand, by operating only one operating member, the tape drive can be switched in the operating mode "slow forward run" and, at the same time, the operating mode "recording" is effected.

According to the invention the foregoing object is achieved by providing in a control device an actuating means adapted to be switched successively, against a biasing which is force, from a first lock-in position "playback" over a second lock-in position "recording" into a third not lock-in position "slow forward run+-recording", with the tape drive means in the mode "slow forward run", independently of the position of the actuating slider and the mode "recording" is selected.

The advantages of the invention are, on the one hand, that the control of the operating modes of the tape drive is effected by an actuating slider and the selection of the operating mode "recording" or "playback" is effected by the operating member, that functions of controlling the tape drive mode and selecting the operating mode are clearly separated. On the bases of said advantageous mode of control the device according to the invention has the advantage that an additional position "slow forward run+recording" is provided which may be engaged by actuating the operating member, i.e., the operating member determining the operating modes "recording" or "playback", independently of the position of the actuating slider. Wrong handling is excluded since the operating member is adapted to be switched from a first snapped-in position "playback" over a second snapped-in position "recording" into the third not snapped-in position "slow forward run+recording".

When the operating member is a press key, the mode of operation is especially simple.

Further objects of the invention are characterized in the claims.

In the present description it is understood that the term "snapping-in" or "snapped-in" or "lockable" position means a detent position of the control means which can be maintained without effort by the operator, and that the term "spring-loaded" or "not snapped-in" position refers to a non-detent position of the control means which is maintained by the operator exerting a force on the control means.

DETAILED DESCRIPTION OF THE INVENTION

Figure 1:
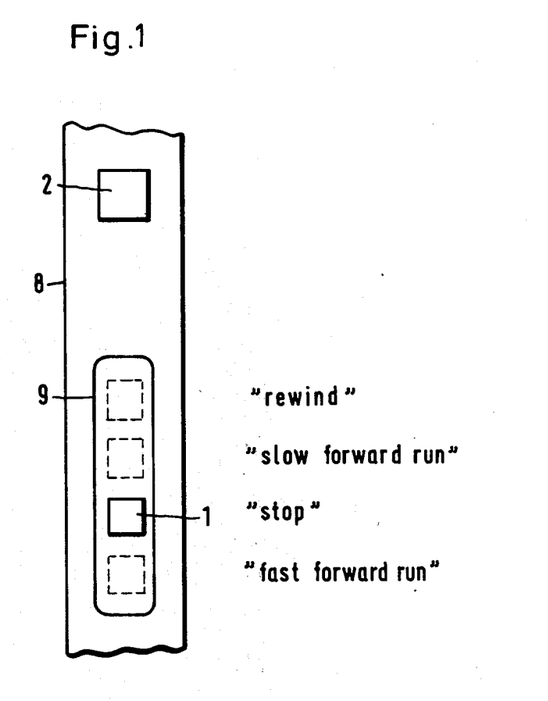
FIG. 1 is a plan view of a device according to the invention.

FIG. 1 illustrates a plan view of a principal arrangement of the operating means of the control device according to the invention. The housing 8 is provided with a hole 9 wherein the actuating slider 1 has a wall longitudinally shiftable. The different positions are (from bottom to top) "fast forward run", "stop", "slow forward run" and "rewind". The two positions "fast forward run" and "rewind" which are most remote from the "stop" position can be engaged only by continuous load on the slider 1 against a restoring spring. The positions "slow forward run" and "stop" are, however, lockable. Adjacent to the actuating slider 1 and preferably in the same housing wall is provided an operating member 2, which may be a press key and which may be shifted by means of pressure from the position "playback" into the lockable position "recording" and from said position into a third not lockable position "slow forward run+recording" whereby it switches-in the operation "recording" and sets the tape drive in the operating condition "slow forward run" even if the actuating slider 1 is in the "stop" position.

Figure 2:
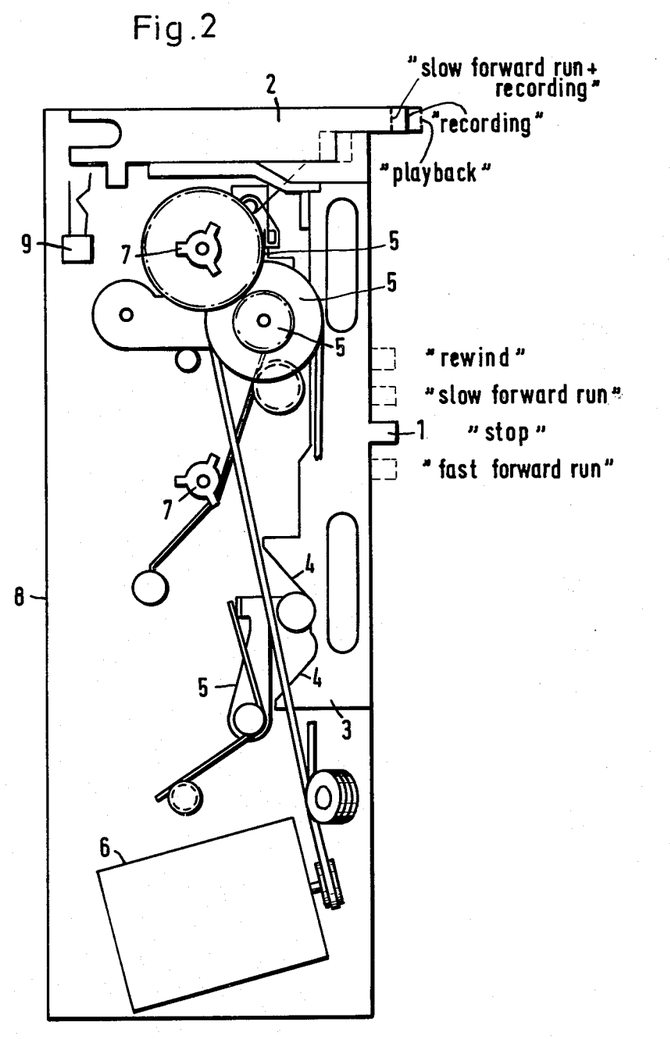
FIG. 2 is a side view of a device according to the invention which is incorporated in a miniature tape recorder.

FIG. 2 illustrates a device according to the invention for controlling a miniature tape recorder. The actuating slider 1 and the operating member 2 are provided at an outer wall of the housing 8. The order of the position of the actuating slider and of the operating member corresponds with that shown in FIG. 1. The actuating slider 1 is connected to a control member 3 including cam surfaces or cams 4 for controlling the devices of the tape drive. The shifting of the actuating slide 1 is transmitted directly into a shifting of the control member 3. The cams 4 of the control member 3 control, in a suitable manner, tape drive means and the motor 6 of the tape drive, and provide in the respective positions of the actuating slider 1 corresponding operating conditions of the tape drive. As to details, reference is made to the description of the other drawing figures below. The operating member 2, which may be a press key, is in its unactuated normal position in the position "playback", and may be moved under pressure into the lockable position "recording" to switch electric contacts which effect the operation "recording". In the third, furtherest depressed and not lockable position of the operating member "slow forward run+recording", the operation "slow forward run" of the tape drive is effected in addition to the operation recording by actuating the switch contact 10 when the actuating slider 1 is in the "stop" position. The tape is then moved with slow forward speed over the rewind tape winding 16 seated on a rewind shaft 7. Details concerning the operating member will be described below in connection with the drawings.

Hereinafter, however, the driving means for the device according to the invention is described.

Figure 3:
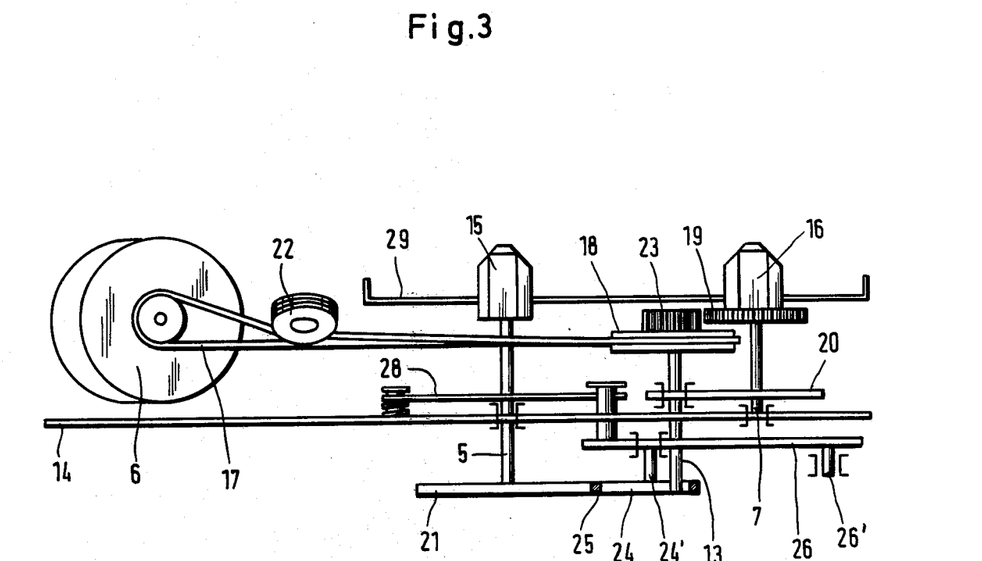
FIG. 3 is a side view of a driving system of the device according to the invention and illustrates the operating mode "forward run"

FIG. 3 is a side view of a preferred embodiment of the driving unit of the device according to the invention. The rewind shaft 7 and a forward winding shaft 5 are mounted in the lower plate 14. At the upper ends of the rewind shaft and the forward winding shaft tape windings or spindles 16 and 15 are provided for receiving suitable tape cassettes. An intermediate shaft 13 extends parallel to the forward winding shaft and the rewind shafts 5 and 7, respectively, and is mounted for pivotal motion on a lever 20. The intermediate shaft 13 is provided at its upper end with a driving belt wheel 18 which may be a flywheel with a corresponding mass. A driving belt 17 runs over the driving belt wheel 18, and is rotated by the shaft of the motor 6 running over a castor or idler wheel 22. The motor shaft of the motor 6 is arranged in a plane substantially perpendicular to the rewind and forward winding shaft 7 and 5 respectively. For reasons of a space saving it may be advantageous to turn the motor slightly out of the plane extending perpendicularly to the rewind and forward winding shafts. The castor wheel 22 is arranged in such a manner that the driving belt 17 runs upon the driving belt wheel 18 without any substantial axial force components. This ensures that the driving belt remains safely on the driving belt wheel. A driving wheel 19 is seated on the rewind shaft 7. A driving wheel 21 is provided on the forward winding end 5, preferably on the shaft and opposite the tape winding 15. The intermediate shaft 13 is provided on the same level as the driving wheel 19, with a driving wheel 23 which is preferably a toothed wheel like the driving wheel 19. Between the intermediate shaft 13 and the driving wheel 21 of the forward running shaft 5 an intermediate wheel 24 with a resilient coating 25 is provided at the same level as the driving wheel 21. The intermediate wheel 24 has a shaft 24' mounted on a pivoted lever 26, which is pivotably mounted about a bearing 26'. The swinging movement of the intermediate wheel 24 mounted on the lever 26 is effected preferably against an upstanding post 26a on a tension spring 28 pressing against the lever 26. Parallel to the lower plate 14 an upper plate 29 is provided having holes for the passage of the tape windings 15 and 16 and secured at the level of the tape windings.

FIGS. 4 to 10A are plan views of a slightly modified embodiment of the device according to the invention to control the recording and playback of a tape recorder in its different operating modes. In order to show the details, the upper plate 29 has been omitted. The parts corresponding with the embodiment shown in FIGS. 2 and 3 are provided with like characters. Figures designated with "A" are a side view of a part of the operating member 2 and the co-operating end of the control member 3 for the different modes of operation. The operating member 2 and the control member 3 are made of metal sheets. FIGS. 4 to 10 illustrate the contacts which are actuated by the actuation of the control member 3 and the operating member 2 in order to switch thereby electric device of the tape recorder.

Like the driving system of the above-described embodiment, the driving system of the embodiment which will now be described comprises a driving belt wheel 18 which is driven by mean of the driving belt 17 and the motor 6. The driving belt 17 also runs over a castor wheel 22. The driving belt wheel 18 is seated on an intermediate shaft 13 which is mounted at the free end of a pivoted lever 20. The pivoted lever 20 is pivotable about an axis 38. The intermediate shaft 13 is provided with a driving wheel 23 which is adapted to be pivoted relative to the driving wheel 19 seated on the rewind shaft 7 to engage it. In this state the rewind shaft 7 is driven to rotate the rewind winding 16 so that the operation "rewind" is effected.

When the intermediate shaft 13 is pivoted relative to the intermediate wheel 24, it drives the forward winding shaft 5 by the driving wheel 21 and thus the forward winding tape winding 15. When the tape winding 15 is driven, the operation "forward run" is effective.

The control member 3 is adapted to be shifted into the four positions shown in FIG. 1 by the actuating slider 1 on which is seated an actuating button 11 for easy operation. The control member 3 is therefore provided with two longitudinal recesses or slots 3a through which guide pins 3b extend along which it is shiftable. The control member 3 is further provided at its end distal from the operating member 2 with cam surfaces or cams 4, between which two notches 4a are provided which are separated by a web. A pivoted lever 35 engages by its attached roll 36 said surface and notches, respectively, and is pivotable about an axis 38. The axis 38 is provided with a spring 39, having one free arm pressing the free end of the pivoted lever 35 against the cams 4 and the notches therebetween, and having the other free arm clamped behind a pin 40 to press the pivoted lever 35 in the direction towards the control member 3.

At the end of the control member 3 opposite the cams 4 a lug 41 is provided extending vertically from the control member 3. The purpose of said lug 41 will become evident from the following description.

For easier manipulation, the operating member 2 is provided at its extreme end with an actuating button 12. The operating member 2 moves in the embodiments described perpendicularly to the control member 3, and is provided for this purpose with two longitudinal slots 2a through which guide pins 2b extend. A tension spring 42 engaging one of the guide pins 2b and a projection 2c of the operating member 2, pulls the operating member out of the housing 8 so that it is, when it is released, in the most remote position extending from the housing. In the longitudinal direction of the operating member 2, a leaf spring 43 is provided having its free end bent such that a V-shaped portion is formed whose extreme lug extends vertically to the direction of motion of the operating member 2. The leaf spring 43 is adapted to be moved beyond the free end of the lug 41, which is in its way when the slider 1 is in the positions "stop" and "slow forward run", into the housing 8 against the bias of the tension spring 42; the leaf spring 43, however, snaps in its normal position when it has overcome the lug 41 so that the tension spring 42 cannot withdraw the operating member 2 into its initial position when the actuating slider 1 is in the positions as indicated. By a further depression, the operating member 2 can be brought, as described above, into the position "slow forward run+recording".

The free arms of the switch contact 10 and of a recording contact 30 are disposed in the path of movement of the operating member 2. A starting contact 31 is provided in the path of movement of the control member 3 and of an attached pin 32. A rewind contact 33 is disposed in the path of movement of the pivoted lever 35.

Figure 4:
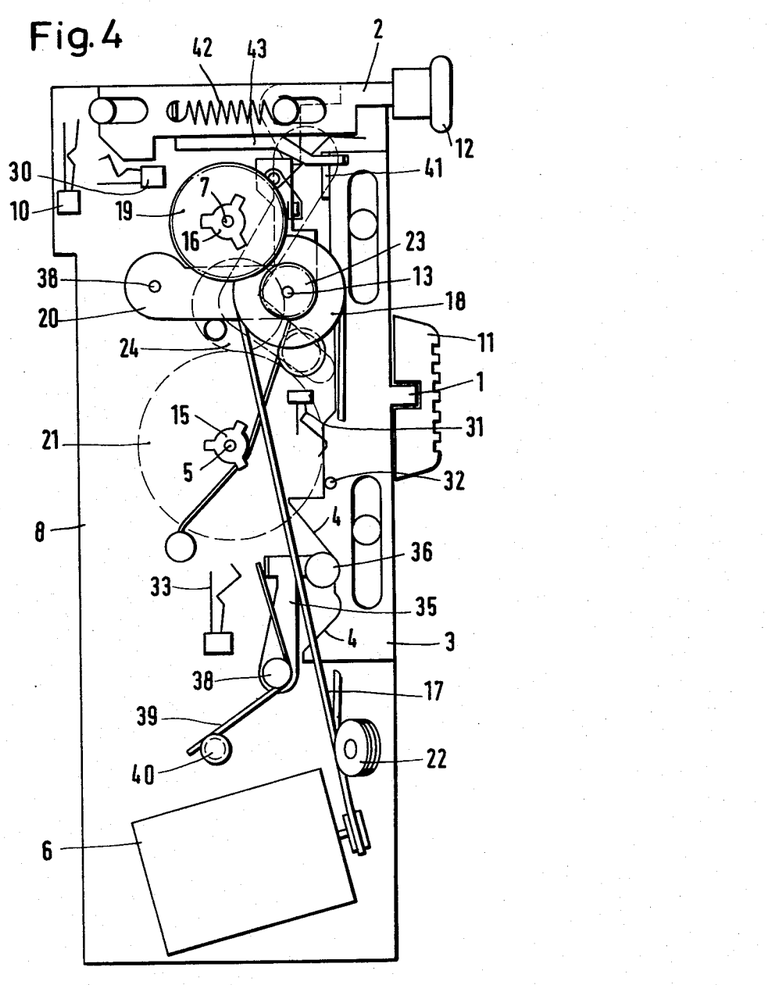
FIGS. 4 to 10A illustrate different positions of the operating member and control member for recording, playback, fast forward run and fast rewind; those Figures designated with "A" illustrate a side view of the operating member in the respective positions.
Figure 4A:
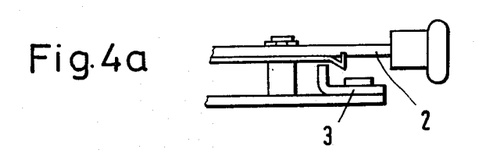

FIG. 4 illustrates the device for controlling the recording and playback of a tape recorder in the position "stop". The actuating slider 1 and, accordingly, the control member 3 are adjusted in such a manner that the roll 36 is pressed by the pivoted lever 35 into one of the notches between the cams 4. The operating member 2 is, in this state of operation and as shown in FIG. 4, in its extreme position "playback". In the described positions of the control member 3 and of the operating member 2 illustrated in FIG. 4, none of the above-described contacts is actuated. No voltage is supplied to the motor 6 in this state. As FIG. 4A illustrates, the leaf spring 43 disposed behind the actuating member 2 is in the quiescent state.

Figure 5:
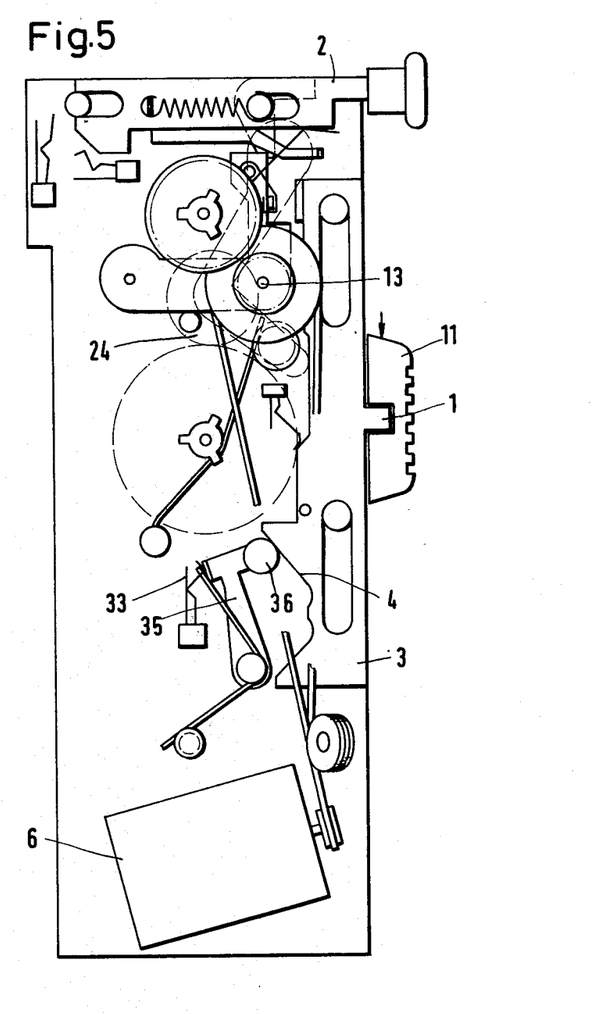
Figure 5A:
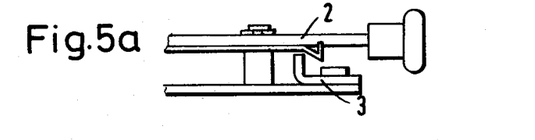

FIG. 5 shows that the device for controlling the recording and playback is adjusted in the position "fast forward run". In order to achieve this mode of operation, the actuating slider 1 and thus the control member 3 must be shifted "downwards". With this movement, the cam 4 moves the pivoted lever 35 via the roll 36 counterclockwise until the pivoted lever 35 closes the rewinding contact 33. By means of the rewinding contact 33 an increased voltage is supplied to the motor 6 by a motor control 55, described below, so that by the intermediate shaft 13 and the intermediate wheel 24 the forward winding shaft 5 is caused to perform a fast forward run. Reference is made to the fact that in this position the operating member 2 is in the same position as illustrated in FIG. 4, as a comparison of FIGS. 4A and 5A shows. In order to show that the position of the actuating slider 1 in "fast forward run" can be maintained only by exerting a force, said force is illustrated in FIG. 5 by an arrow at the actuating button 11.

Figure 6:
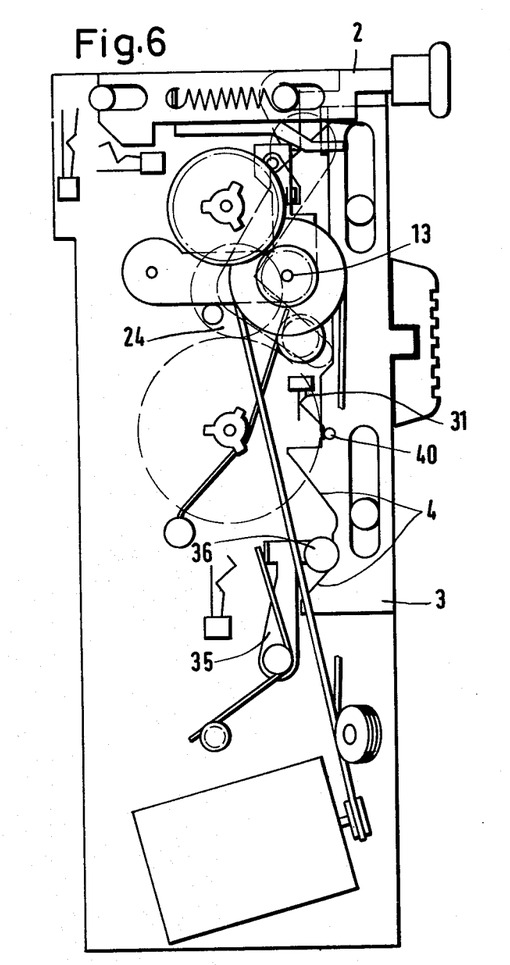
Figure 6A:
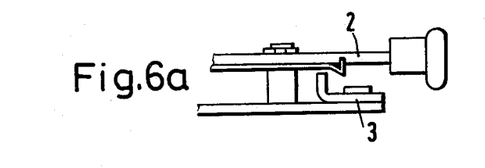

According to FIG. 6, the device for controlling recording and playback of a tape recorder is in the mode "playback" and "slow forward run", i.e., that the actuating slider 1 and thus the control member 3 are adjusted in such a manner that the roll 36 of the pivoted lever 35 engages the other one of the notches 4a between the cams 4, and that the starting contact 31 is actuated by the pin 40. Thereby, the motor 6 receives via the motor control which will be described below, the normal forward run voltage, whereby the forward winding shaft 5 is rotated by the intermediate shaft 13 and the intermediate wheel 24 so that the mode "slow forward run" is effected. Also the amplifier described farther below receives voltage by the start contact 31 so that reproduction is obtained from the running tape. As indicated above, the operating member 2 is in the position "playback" which was explained in connection with FIGS. 4 and 5 and 4A and 5A.

Figure 7:
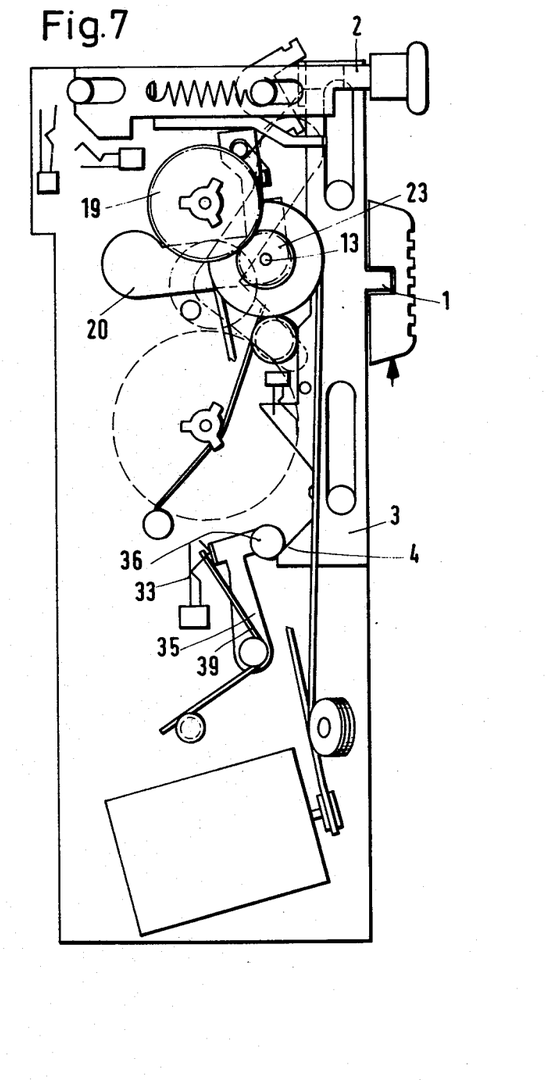
Figure 7A:
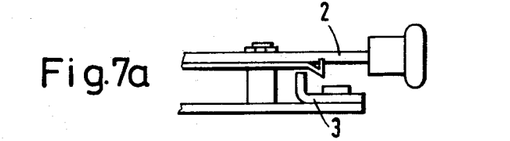

FIG. 7 illustrates the mode of operation "fast rewind". In this state, the actuating slider 1 and thus the control member 3 are entirely shifted "upwards", whereby the other cam 4 pivots the pivoted lever 35 via the roll 36 counterclockwise contrary to the power of the spring 39, until the rewind contact 33 is closed. At the same time, the pivoted lever 20 is pivoted counter-clockwise so that the driving wheel 23 seated on the intermediate shaft 13 engages the driving wheel 19. The motor 6 receives by the rewinding contact 33 and the motor control again an increased voltage so that it is caused to start a fast mode, whereby, however, the rewind shaft is driven. The operating member 2 is again in the same position "playback" like in the positions shown in FIGS. 4 to 6. In order to show that the mode "fast rewind" can be maintained only by a force, the actuating button 11 is provided with an arrow to show the direction of force.

Figure 8:
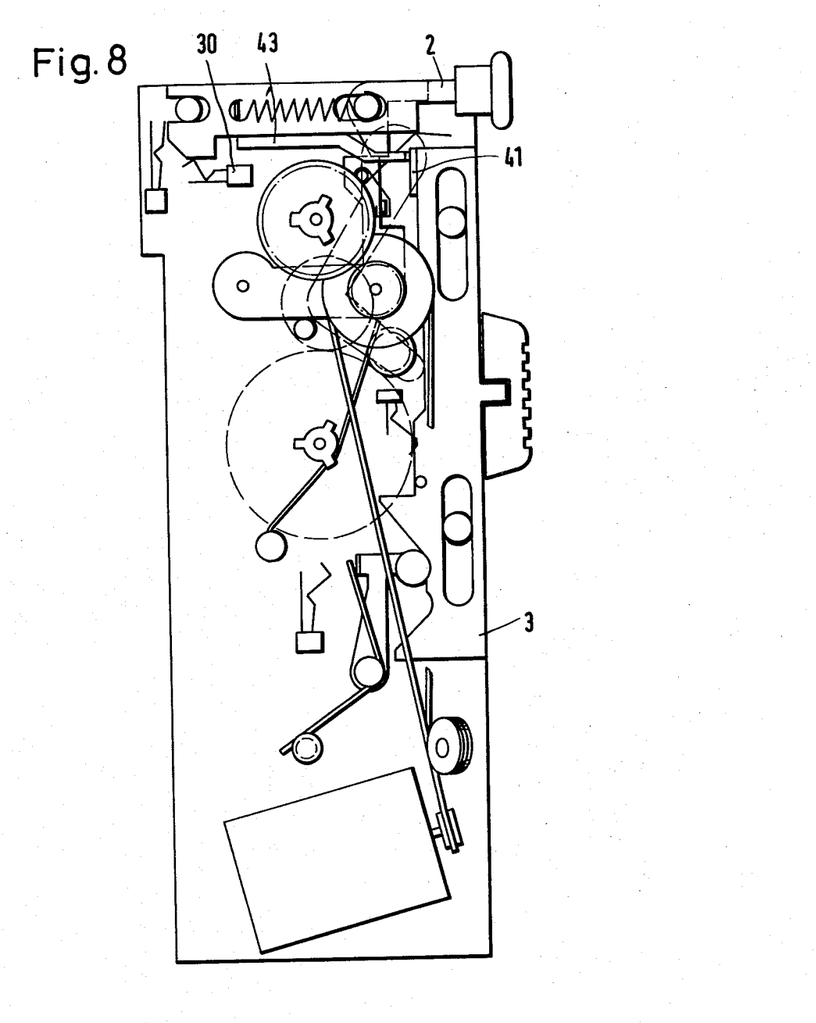
Figure 8A:
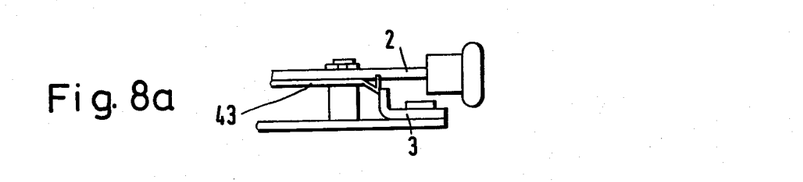
Figure 9:
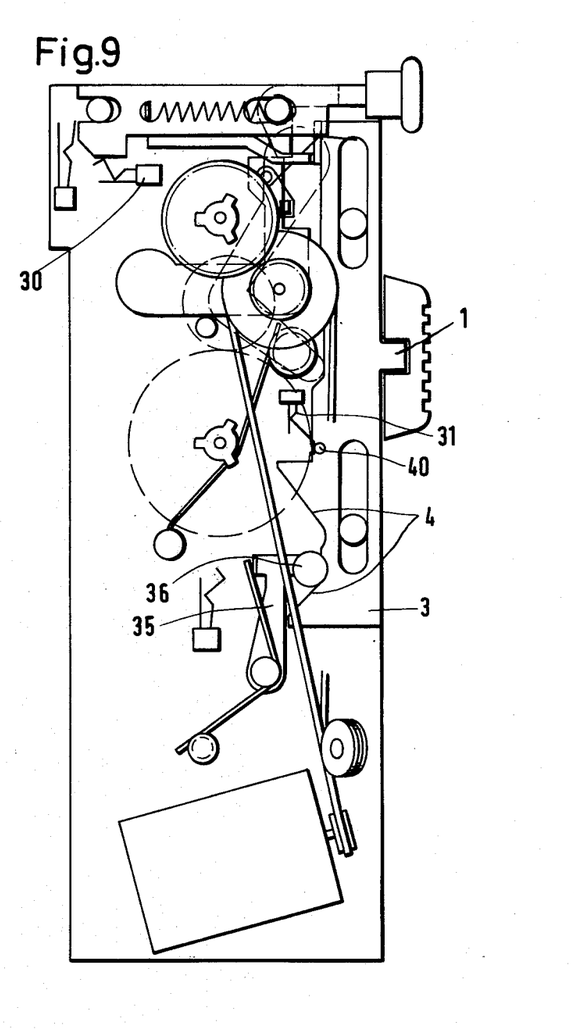
Figure 9A:
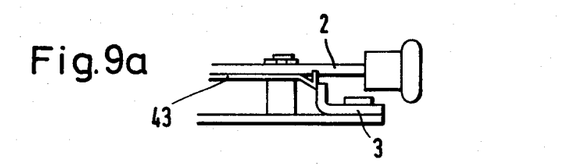
Figure 10:
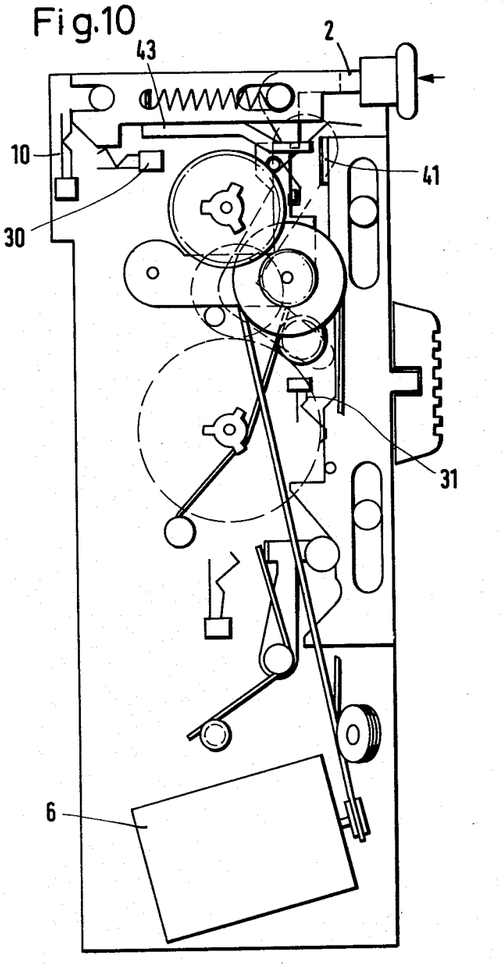
Figure 10A:
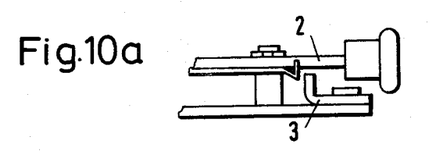

FIGS. 8 to 10 illustrate the device for controlling the recording and playback of a tape recorder in the different modes as they are used for "recording".

According to FIG. 8, the operating member 2 is in the position "recording" where it closes the recording contact 30. The actuating slider 1 and thus the control member 3 are in the "stop" position so that the motor does not receive voltage. By closing the recording contact, the tape recorder is, however, prepared for recording. The recording contact is actually a multiple-pole switch, upon the closure of which the microphone of the aparatus is connected to the amplifier input and the amplifier output to the sound head. Moreover, the erase oscillator is connected to the erase head. On the other hand, the loudspeaker of the tape recorder is disconnected. It is mentioned that, when the recording contact is opened, the sound head is connected to the amplifier input and the amplifier output to the loudspeaker. In the mode "recording", the leaf spring 43 is shifted behind the lug 41 of the control member 3 whereby the operating member 2 is blocked against a return into the position "playback" until the lug 41 is moved out of the path of the leaf spring 43 when the actuating slider 1 and the control member 3 are moved into "rewind" and "fast forward run" positions.

FIG. 9 illustrates that in the position of the operating member 2 shown in FIG. 8, recording may take place by displacing the actuating slider 1 and control member 3, respectively, into the position "slow forward run" which has been described in connection with the playback operation shown in FIG. 6. By switching-over the control member 3 between the positions "slow forward run" (FIG. 9) and "stop" (FIG. 8), recording is possible with corresponding interruptions. It is only necessary to shift the actuating slider 1 and the associated control member 3 between the two modes of operation.

FIG. 10 illustrates the mode "slow forward run+-recording" which can also be called "recording quick start". The operating member 2 is therefore pressed completely until stop, whereby the recording contact 30 as well as the switching contact 10 are closed. The switching contact 10 is connected parallel to the start contact 31 and thereby voltage is applied to the motor 6 by the motor control, and the motor starts running. As described above, the recording contact 30 provides the connections necessary for recording. The position of the operating member 2 "slow forward run+recording" is slightly spring-biased since the spring 42 tends to pull the operating member 2 outwards until the end of the leaf spring 43 pushes against the lug 41 of the control member 3. In order to be able to stop the tape recorder by releasing the operating button 12, the actuating slider 1 and the control member 3 are be in the "stop" position (FIG. 8).

In order to release the latching of the operating member 2 in the position "recording", it is necessary, as described above, to shift the control member 3 into the position "rewind" (FIG. 7) or "fast forward run" (FIG. 5).

Figure 11:
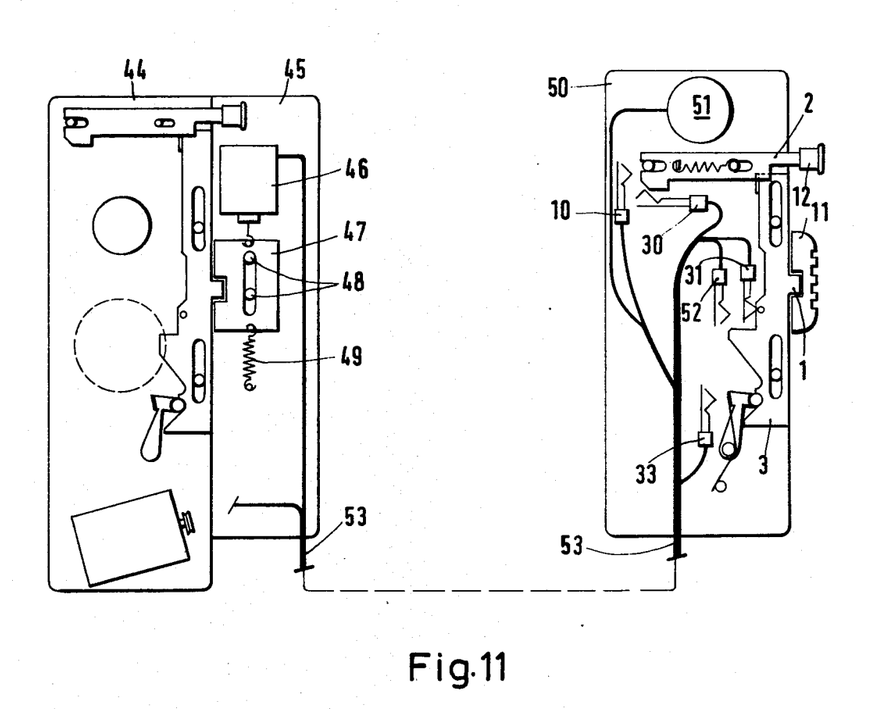
FIG. 11 illustrates an embodiment of the invention used in a dictating machine with hand-held microphone.

FIG. 11 illustrates a modified embodiment of the device for controlling recording and playback of a tape recorder to be used in a hand microphone with remote operation. The dictating or recording apparatus 44 is provided with a remote control appliance 45. The actuating slider 1 and the control member 3 as well as the operating member 2 are provided in said microphone 50. Remote control appliance 45 and hand microphone 50 are interconnected by a cable 53. The remote control appliance 45 is provided with a link 47 which is guided by pins 48 in the direction of motion of the actuating slider 1 and engages via a recess 47a the actuating slider. The link 47 is tensioned at one end by means of a tension spring 49 so that it is pulled into the direction of the position "fast forward run" (FIG. 5). The other end of the link 47 is engaged by a return magnet 46 pulling the link 47 and thus the actuating slider 1 towards the position "rewind" (FIG. 7). The return magnet as well as the motor are controlled by the contacts in the hand microphone 50. For this purpose, the same contacts are provided in the hand microphone 50 as in the device described with respect to FIGS. 1 to 10, said contacts being identified with the same reference numerals. Additionally, a rewind contact 52 is provided which is closed when the control member is shifted to the mode "rewind" and whereby energizes the rewind magnet 46 which brings the control member provided in the dictating apparatus also into the position "rewind" to release thereby the operating member 2 in the dictating apparatus. The other elements in the microphone 50 function in the same manner as described in the other embodiments, with the connecting lines connected to the contacts in the microphone being similarly connected to the dictating apparatus 44 by the connecting cable 53.

Figure 12:
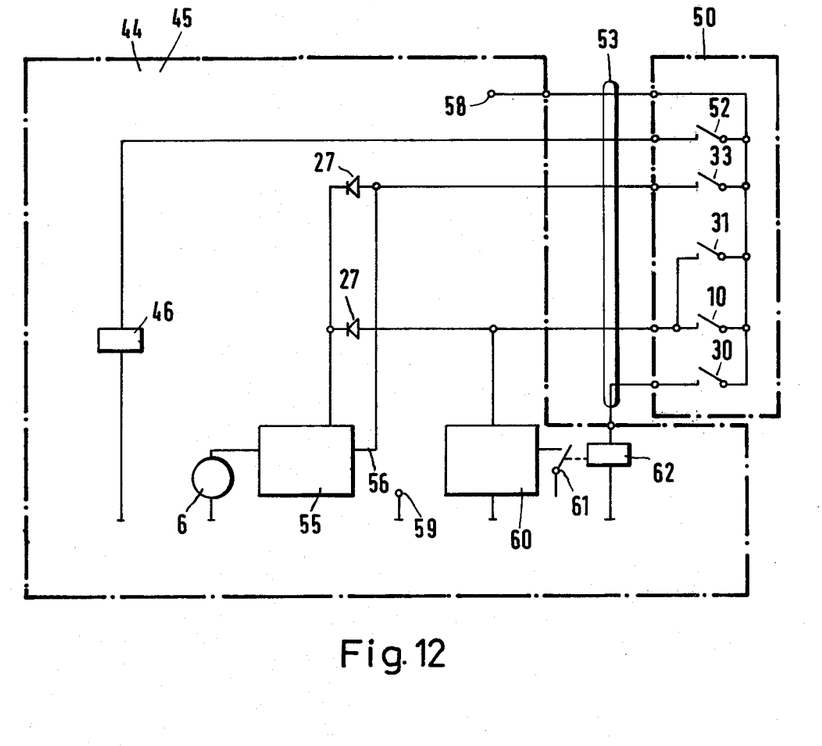
FIG. 12 shows a circuit diagram of the embodiment of the device according to the invention illustrated in FIG. 11.

FIG. 12 illustrates a circuit diagram showing the substantial switching elements and connections of the dictating apparatus 44 and of the remote control appliance 45 as well as of the hand microphone 50. The hand microphone includes the recording contact 30, the switch contact 10 and the parallel start contact 31, the rewind contact 33 as well as an additional rewind contact 52. Said contacts are connected with one end to the plus pole 58 of the battery (not shown) disposed in the dictating apparatus. The free end of the recording contact 30 is connected by the connecting cable 53 to a recording relay 62 in the dictating apparatus. The free end of the switching contact 10 is connected to the free end of the starting contact 31, the amplifier 60 in the dictating apparatus, and by a diode 57 to the input of the motor control 55. The free end of the rewind contact 33 is also connected by a further diode 57a to the input of the motor control 55. The output of the motor control 55 is connected to one input of the motor 6, the other input of which is connected to the minus pole 59 of the current supply. The output of the additional rewind contact 52 is connected to the input of the rewind magnet 46 whose output is connected to the minus pole of the voltage supply. By the contacts 10 and 31 the amplifier 60 as well as the motor control 55 are switched-on. By the rewind contact 33, the input of the motor control 55 as well as its additional control input 56 are charged so that the motor receives an increased voltage for the "fast run" mode.

What is claimed is:

1. A control mechanism for controlling the recording and playback functions of a tape recorder comprising:
    actuating means operably connected to a tape drive means and actuatable to a selected one of a plurality of positions including a "recording" position and a "playback" position in which positions said tape drive means is placed in a "slow forward run" mode; and
    operable means operably connected to said tape drive means and actuatable, independent of said actuating means, in opposition to a restoring force from a first locked-in "playback" position to a second locked-in "recording" position and to a third non-locked-in "slow forward+recording" position in which said tape drive means is placed in its slow forward run mode independent of the position of the actuating means and the recording mode is selected.

2. The control mechanism claimed in claim 1, wherein said operable means further comprises:
    a depressible, pressure-responsive key.

3. The control mechanism claimed in claim 1, wherein
    said actuating means is actuatable to a selected one of a plurality of positions including said "record" position and said "playback" position and additionally it is operable to a "fast forward run" position or a "rewind" position, said operable means caused to remain in and return to said "playback" position from said "recording" position when said actuatable means is actuated to said "fast forward run" or said "rewind" position.

4. The control mechanism claimed in claim 1, wherein
    said actuatable means and said operable means are located adjacent one another and are selectively operable with a single finger.

5. The control mechanism claimed in claim 2, wherein
    said pressure-responsive key is slidably mounted relative to a base support for reciprocal movement inwardly and outwardly of said tape recorder, said key being resiliently biased outwardly of said tape recorder by a restoring spring in tension having one end thereof secured to said key and the other end thereof secured to said base.

6. The control mechanism claimed in claim 5, further comprising:
    a leaf spring member secured to said key and extending in a direction along the path of movement of said key, said leaf spring mounted for yielding movement in a path transverse to said first mentioned path;
    said actuatable means includes a lug secured thereto and extending therefrom, said lug positonable in the path of said leaf spring,
    whereby depression of said key from said "playback" to said "recording" position causes said leaf spring to engage said lug and yield in a first direction transverse to said lug until the end of said leaf spring clears said lug and then yield in a second direction, opposite to said first direction, to prevent the restoring spring force from restoring the key to said "playback" position from said "recording" position.

7. The control mechanism claimed in claim 6, wherein
    said key, in its "recording" position, causes recording contacts to effect recording functions and, in its "slow forward run+record" position, additionally closes motor contacts to supply operating voltage to a motor.

8. The control mechanism claimed in claim 6
    said key is released from said leaf spring and restored to said "playback" position by said restoring spring when said actuatable means is actuated to either of said "rewind" or "fast forward run" positions when said key is in said "record" position.

9. The control mechanism claimed in claim 1, wherein
    said control functions for said actuatable means and said operable means are effected by a remote control means controllable from a hand held microphone connected to said tape recorder.

* * * * *

UNITED STATES PATENT AND TRADEMARK OFFICE
CERTIFICATE OF CORRECTION

PATENT NO. : 4,152,732
DATED : May 1, 1979
INVENTOR(S) : KARL WEIS and DIETER E. WARMBIER It is certified that error appears in the above-identified patent and that said Letters Patent are hereby corrected as shown below:

Column 2, Line 23, "dictate" should read --- dictation ---.

Column 3, Line 10, after "means" insert --- which is ---.

Column 3, Line 11, delete "which is".

Column 3, Line 37, "press" should read --- pressure ---.

Column 4, Line 6, delete "is" and insert --- has a wall ---.

Column 4, Line 7, delete "has a wall" and insert --- is ---.

Column 5, Line 16, delete "end" and insert --- shaft ---; after "on the" delete "shaft and" and insert --- end ---.

Column 5, Line 28, delete "an upstanding post 26a on".

Column 5, Line 29, between "against" and "the" insert --- an upstanding post 26a on ---.

Column 5, Line 51, "mean" should read --- means ---.

Column 8, Line 40, between "are" and "in" delete "be".

Column 9, Line 4, "whereby" should read --- thereby ---.

UNITED STATES PATENT AND TRADEMARK OFFICE
CERTIFICATE OF CORRECTION

PATENT NO. : 4,152,732
DATED : May 1, 1979
INVENTOR(S) : KARL WEIS and DIETER E. WARMBIER It is certified that error appears in the above-identified patent and that said Letters Patent are hereby corrected as shown below:

Column 9, Line 10, "connecting" should read --- connection ---.

Column 10, Line 34, "positonable" should read --- positionable-.

Signed and Sealed this

Twenty-third Day of October 1979

[SEAL]

Attest:

RUTH C. MASON
Attesting Officer

LUTRELLE F. PARKER
Acting Commissioner of Patents and Trademarks